United States Patent [19]
Harrison

[11] Patent Number: 5,248,187
[45] Date of Patent: Sep. 28, 1993

[54] SEAT BELT EXTENSION APPARATUS

[76] Inventor: Rick G. Harrison, R.R. 4 Box 164, Mt. Carmel, Ill. 62863

[21] Appl. No.: 771,120

[22] Filed: Oct. 4, 1991

[51] Int. Cl.$^5$ .............................................. B60R 22/12
[52] U.S. Cl. ..................................... 297/482; 297/468; 297/488
[58] Field of Search .............. 297/468, 482, 464, 487, 297/488; 280/801, 808, 751

[56] References Cited

U.S. PATENT DOCUMENTS

| 4,610,463 | 9/1986 | Efrom | 297/488 X |
| 4,699,401 | 10/1987 | Saenz | 297/482 X |
| 5,080,441 | 1/1992 | Stevenson et al. | 297/488 |

FOREIGN PATENT DOCUMENTS

| 3342594 | 6/1985 | Fed. Rep. of Germany | 297/468 |
| 2524810 | 10/1983 | France | 297/482 |

Primary Examiner—Peter R. Brown
Attorney, Agent, or Firm—Leon Gilden

[57] ABSTRACT

A seat belt extension apparatus to accommodate elongate adjustment of a seat belt relative to an associated vehicular passenger seat, to include a central web with a rear buckle plate and forward buckle assembly securable to the existing seat belt structure. A modification includes an enlarged abutment plate assembly formed with a padded exterior surface to accommodate and apply pressure to an enlarged area, wherein the pressure plate is vertically and adjustably slidable relative to the central web. Further, an accessory belt structure is arranged to provide for a timer assembly in association with an audible alarm to effect periodic audible signals to maintain driver alertness.

3 Claims, 4 Drawing Sheets

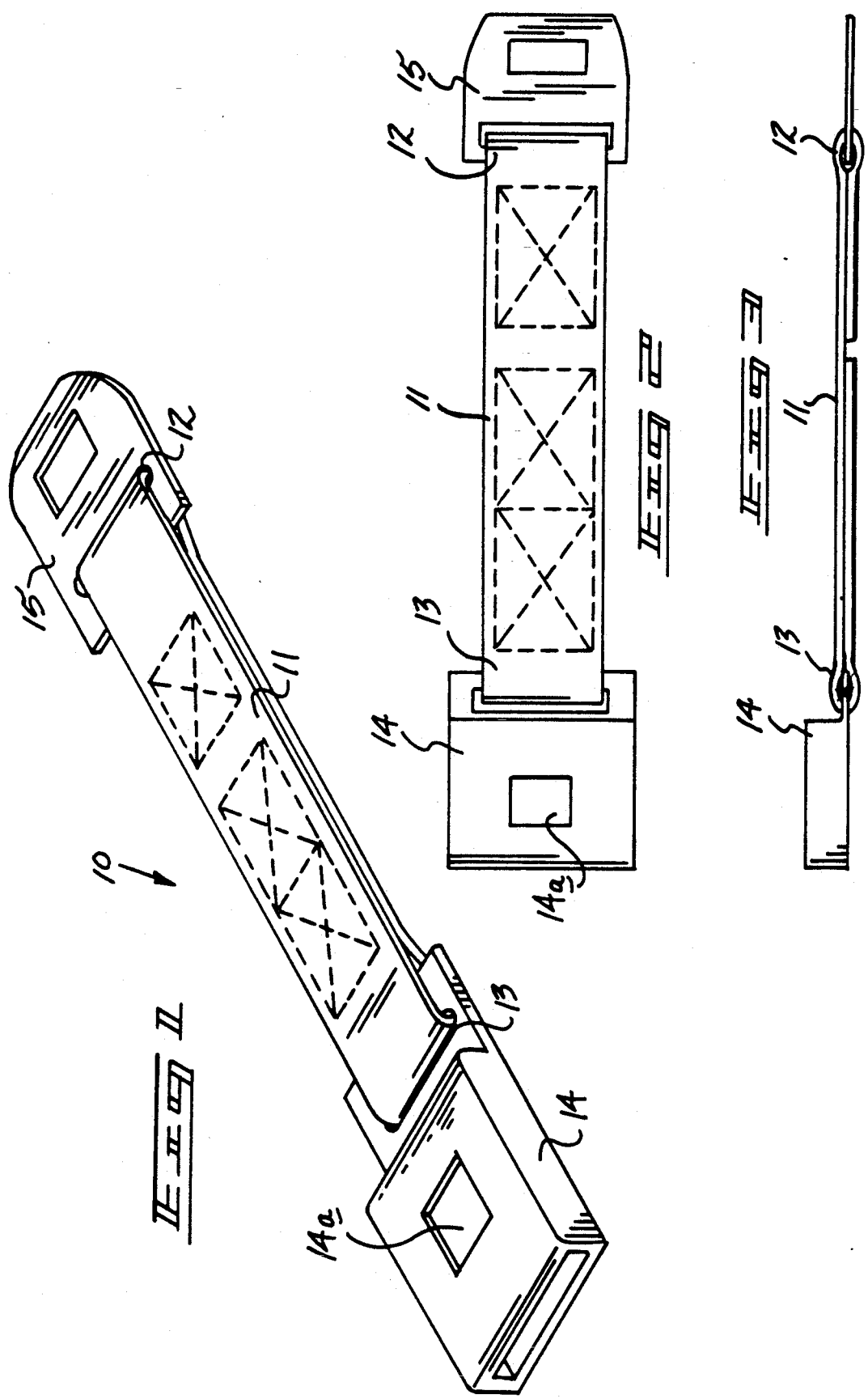

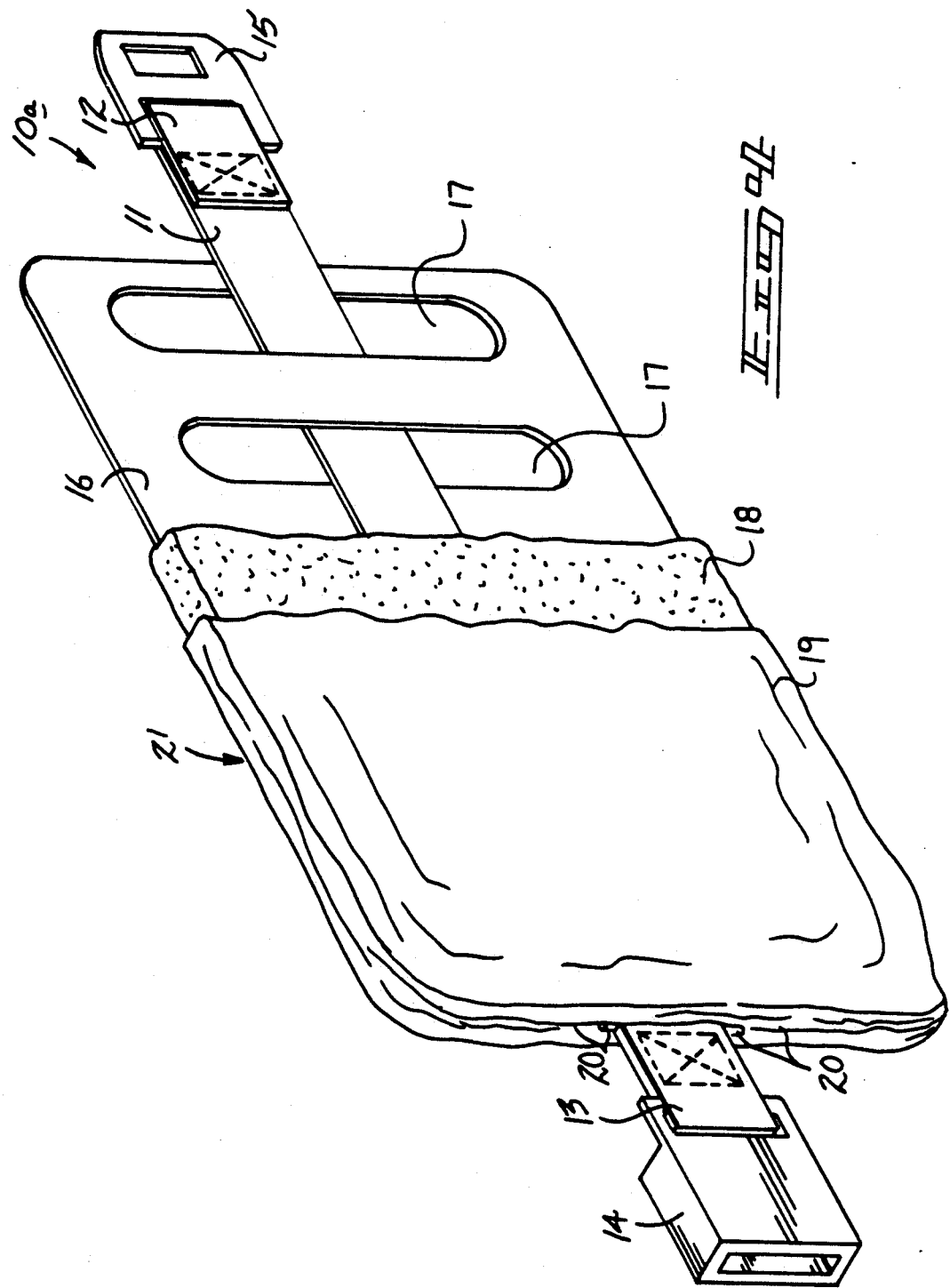

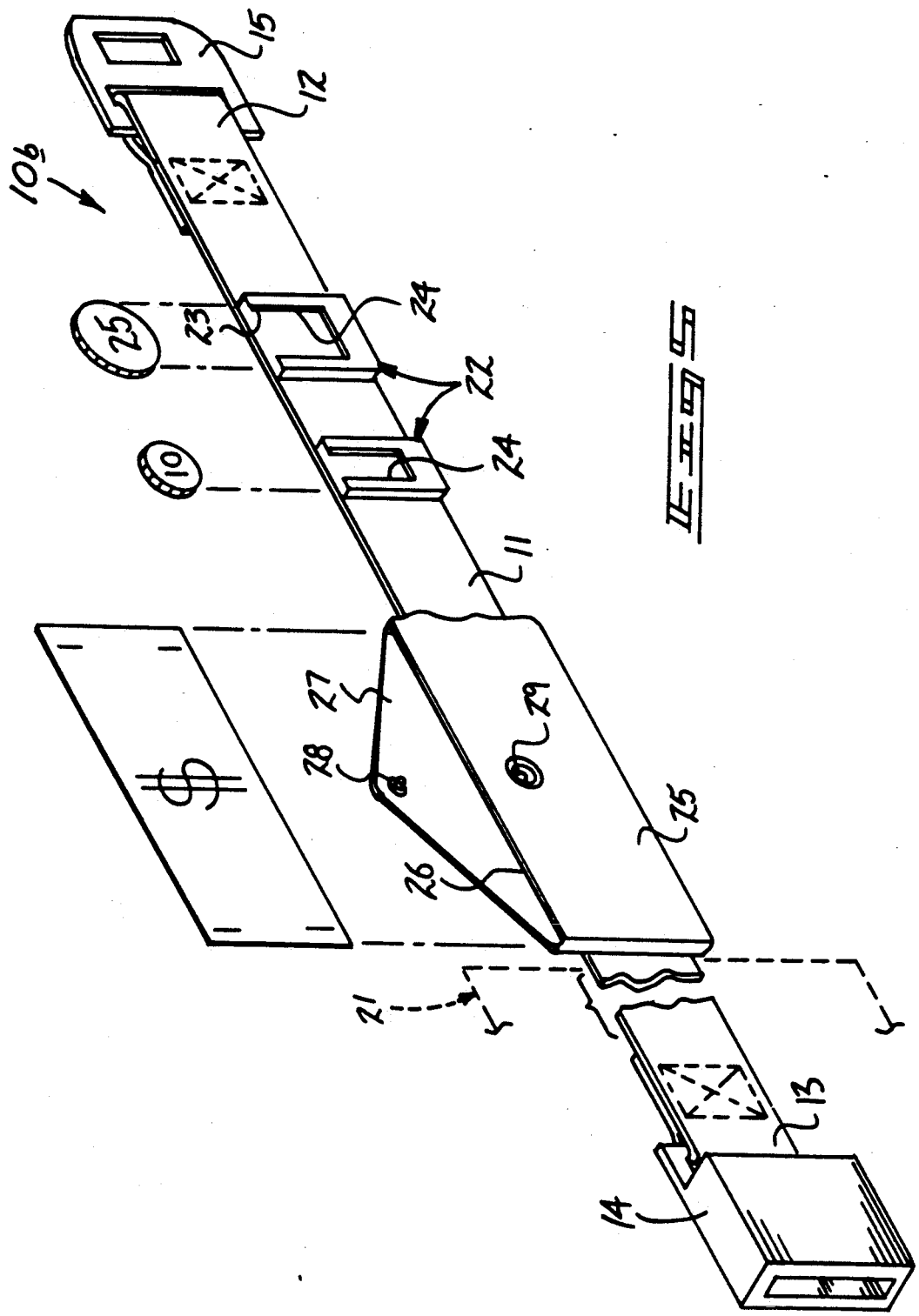

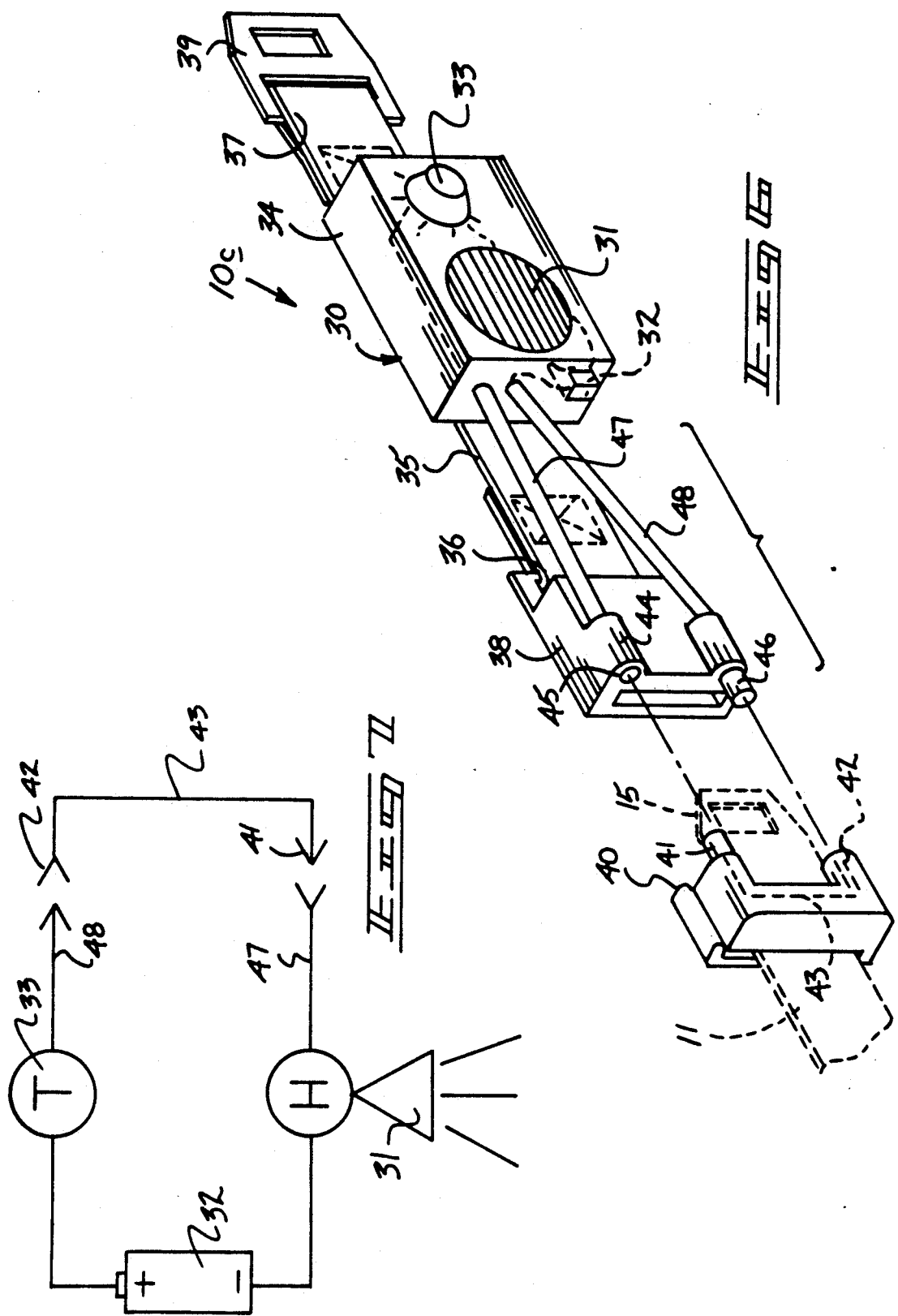

SEAT BELT EXTENSION APPARATUS

BACKGROUND OF THE INVENTION

1. Field of the Invention

The field of invention relates to seat belt apparatus, and more particularly pertains to a new and improved seat belt extension apparatus wherein the same is arranged to provide for an elongate length of seat belt to be mounted to an existing seat belt structure.

2. Description of the Prior Art

Seat belt apparatus of various types are utilized in the prior art to accommodate various conditions relative to transport vehicles. At times, to accommodate individuals of enlarged proportions or to secure various components relative to a seat belt structure, an elongate length seat belt is desirable.

Prior art structure relating to seat belt apparatus is exemplified in U.S. Pat. No. 3,605,453 to Cicero wherein a seat belt extension bracket is arranged for mounting a child's car seat within a passenger compartment of a motor vehicle.

U.S. Pat. No. 4,765,558 to Higbee sets forth a particular seat belt extractor arranged to provide for extension by its retraction of a seat belt web.

U.S. Pat. No. 4,796,915 to Kaurich, et al. sets forth a seat belt extension utilizing two or more multi-plastic sleeves telescopingly slidable relative to one another to associate the seat belt structure relative to a close relationship around an occupant when the door is closed and the belt is retracted.

As such, it may be appreciated that there continues to be a need for a new and improved seat belt extension apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of seat belt apparatus now present in the prior art, the present invention provides a seat belt extension apparatus wherein the same is arranged for the elongate extension of a seat belt structure. As such, the general purpose of the present invention, which will be described subsequently in greater detail, is to provide a new and improved seat belt extension apparatus which has all the advantages of the prior art seat belt apparatus and none of the disadvantages.

To attain this, the present invention provides a seat belt extension apparatus to accommodate elongate adjustment of a seat belt relative to an associated vehicular passenger seat, to include a central web with a rear buckle plate and forward buckle assembly securable to the existing seat belt structure. A modification of the invention includes an enlarged abutment plate assembly formed with a padded exterior surface to accommodate and apply pressure to an enlarged area, wherein the pressure plate is vertically and adjustably slidable relative to the central web. Further, an accessory belt structure is arranged to provide for a timer assembly in association with an audible alarm to effect periodic audible signals to maintain driver alertness.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determined quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved seat belt extension apparatus which has all the advantages of the prior art seat belt apparatus and none of the disadvantages.

It is another object of the present invention to provide a new and improved seat belt extension apparatus which may be easily and efficiently manufactured and marketed.

It is a further object of the present invention to provide a new and improved seat belt extension apparatus which is of a durable and reliable construction.

An even further object of the present invention is to provide a new and improved seat belt extension apparatus which is susceptible of a low cost of manufacture with regard to both materials and labor, and which accordingly is then susceptible of low prices of sale to the consuming public, thereby making such seat belt extension apparatus economically available to the buying public.

Still yet another object of the present invention is to provide a new and improved seat belt extension apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic top view of the instant invention.

FIG. 3 is an orthographic side view of the instant invention.

FIG. 4 is an isometric illustration of a modification of the invention.

FIG. 5 is an isometric illustration of a further modification of the invention.

FIG. 6 is an isometric illustration of a modification of the invention.

FIG. 7 is a diagrammatic illustration of the junction of the alarm structure.

DESCRIPTION OF THE PREFERRED EMBODIMENT

With reference now to the drawings, and in particular to FIGS. 1 to 5 thereof, a new and improved seat belt extension apparatus embodying the principles and concepts of the present invention and generally designated by the reference numerals 10, 10a, and 10b will be described.

More specifically, the seat belt extension apparatus 10 of the instant invention essentially comprises a flexible elongate web 11 formed with a rear loop 12 at a rear distal end of the web and a forward loop 13 in a forward distal end of the web. A latch assembly 14 including a release button 14a of conventional construction is mounted to the forward loop 13, with an apertured latch plate 15 mounted to the rear loop 12. The latch plate 15 is arranged for securement into an existing latch assembly of an existing conventional seat belt latch relative to a transport vehicle to provide for an extension of that seat belt construction.

The FIG. 4 illustrates the flexible elongate web 11 including an abdomen protector to provide for application of seat belt pressure to a larger surface area, such as with pregnant women, small children, and the like to minimize damage during impact. The protector 21 includes a semi-rigid support plate 16 extending above and below the web 11, including spaced parallel slots 17 that are coextensive from a forward to a rear end of the protector and are orthogonally oriented relative to the web 11 to permit vertical adjustment of the web relative to the protector for adjustment of comfort in use. A foam pad 18 encases the support plate 16 and in turn is covered by a flexible covering layer 19 to provide for enhanced comfort in use. Opening structure 20 receives the web 11 into the covering layer 19 at the sides thereof.

The FIG. 5 illustrates the additional use and mounting of a plurality of coin receiving housings 22 mounted on the web 11 adjacent the protector 21, with each of the coin housing including a "U" shaped slot 23 in cooperation with a front housing wall opening 24 to provide access to the coins contained within the coin receiving housings 22. A pouch assembly 25 includes a pocket 26 to contain currency therewithin, as illustrated, including a cover flap 27 that in turn includes a cover flap fastener 28 cooperative with a pouch fastener 29. The mounting of the currency and coins to the web 11 is of convenience for use in toll booths and the like in conventional use of a vehicle.

The apparatus 10a, as illustrated in FIG. 4, is cooperative with the apparatus of FIG. 5 set forth as construction 10b. The FIGS. 6 and 7 illustrate the 10c to be utilized in association with the apparatus 10a and 10b, as illustrated in the FIG. 6, to include a second buckle web 35 formed with a second belt forward loop 36 and a second belt rear loop 37 mounting a respective latch assembly 38 and latch plate 39. A housing 34 is mounted to the second belt web 35 to include a timer 33, a battery 32, and an audible speaker 31 to define the audible alarm structure 30. A first electrical transmission line 47 and a second electrical transmission line 48 are provided mounted to a second latch plate coupler 44 mounted to the latch assembly 38 that is cooperative with a first latch plate coupler 40 mounted to the elongate web 11 adjacent the latch plate 15. The first latch plate coupler 40 includes a first projection 41 receivable within a second socket 45 of the second latch plate coupler 44. A first socket 42 of the first latch plate coupler 40 is cooperative with a second projection 46 that in turn effects electrical communication between the first and second electrical transmission lines 47 and 48 to complete associated electrical circuit, such as illustrated in FIG. 7, directed through the first latch plate coupler 40. Upon mounting of the second belt web 35 to the web 11, the organization, as illustrated in FIG. 6, provides for an individual to effect audible and timed signals to prevent an individual from dozing while driving a vehicle and is accordingly utilized as an alarm apparatus to maintain an individual and his ability to operate a motor vehicle safely.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A seat belt extension apparatus, comprising,
   a flexible elongate web, the web including a rear distal end and a forward distal end, the rear distal end including a rear loop and the forward distal end including a forward loop, and
   a latch assembly mounted to the forward loop, and
   an apertured latch plate mounted to the rear loop, and
   an abdomen protector longitudinally and transversely adjustable relative to the elongate web mounted to the web, wherein the abdomen protector includes a semi-rigid support plate, the semi-rigid support plate including a plurality of spaced parallel slots arranged transversely relative to the elongate web and extending above and below the transverse web to permit sliding adjustment of the plate transversely relative to the web, and the web directed through the slots to permit longitudinal adjustment of the web relative to the plate, and a foam pad arranged in a surrounding relationship relative to the plate, and a flexible covering layer arranged in surrounding relationship relative to the foam pad, the flexible covering layer including a forward opening and a rear opening directed into respective forward and rear sides of the covering layer aligned relative to one another to effect longitudinal sliding and adjustment of the abdomen protector relative to the web.

2. An apparatus as set forth in claim 1 wherein the web further includes a plurality of coin receiving housings mounted thereon, each coin receiving housing including a "U" shaped slot in a front wall, and a front wall opening directed to the front wall in communication with the slot to permit manual access to the "U" shaped slot and the coin positioned within the "U" shaped slot, and at least one pouch assembly mounted to the web adjacent the plurality of coin receiving housings, wherein the pouch assembly includes a pocket and a cover flap pivotally mounted over the pocket, wherein the cover flap includes a cover flap fastener cooperative with a pocket fastener.

3. An apparatus as set forth in claim 2 further including a second belt web, the second belt web including a second belt web forward loop and a second belt web rear loop, the second belt web forward loop including a second latch assembly and a second belt web rear loop including a second latch plate, and an audible alarm mounted to the second belt web between the second latch assembly and the second latch plate, wherein the audible alarm includes a housing, the housing mounted to the second belt web including a battery, a timer, and a speaker, the battery, the timer, and the speaker arranged in electrical communication relative to one another, and including a first electrical transmission line and a second electrical transmission line in series communication with the speaker, the battery, and the timer, wherein the respective first and second electrical transmission line project exteriorly of the housing, and a second latch plate coupler mounted to the second latch assembly, the second latch plate coupler including a second socket and a second projection arranged in a parallel relationship relative to one another, and the first electrical transmission line directed to the second socket, and the second electrical transmission line directed to the second projection, and a first latch plate coupler mounted to the web adjacent the latch plate, wherein the first latch plate coupler including a first projection cooperative with the second socket, and a first socket cooperative with the second projection, with an electrical transmission coupling line in electrical communication between the first projection and the first socket, whereupon mechanical coupling of the first latch plate coupler with the second latch plate coupler effects electrical communication between the first transmission line and the second transmission line and the electrical transmission coupling line permitting actuation of the audible alarm.

* * * * *